(No Model.)
H. S. BLANCHARD.
QUADRICYCLE FOR LAND AND WATER.
No. 277,667. Patented May 15, 1883.
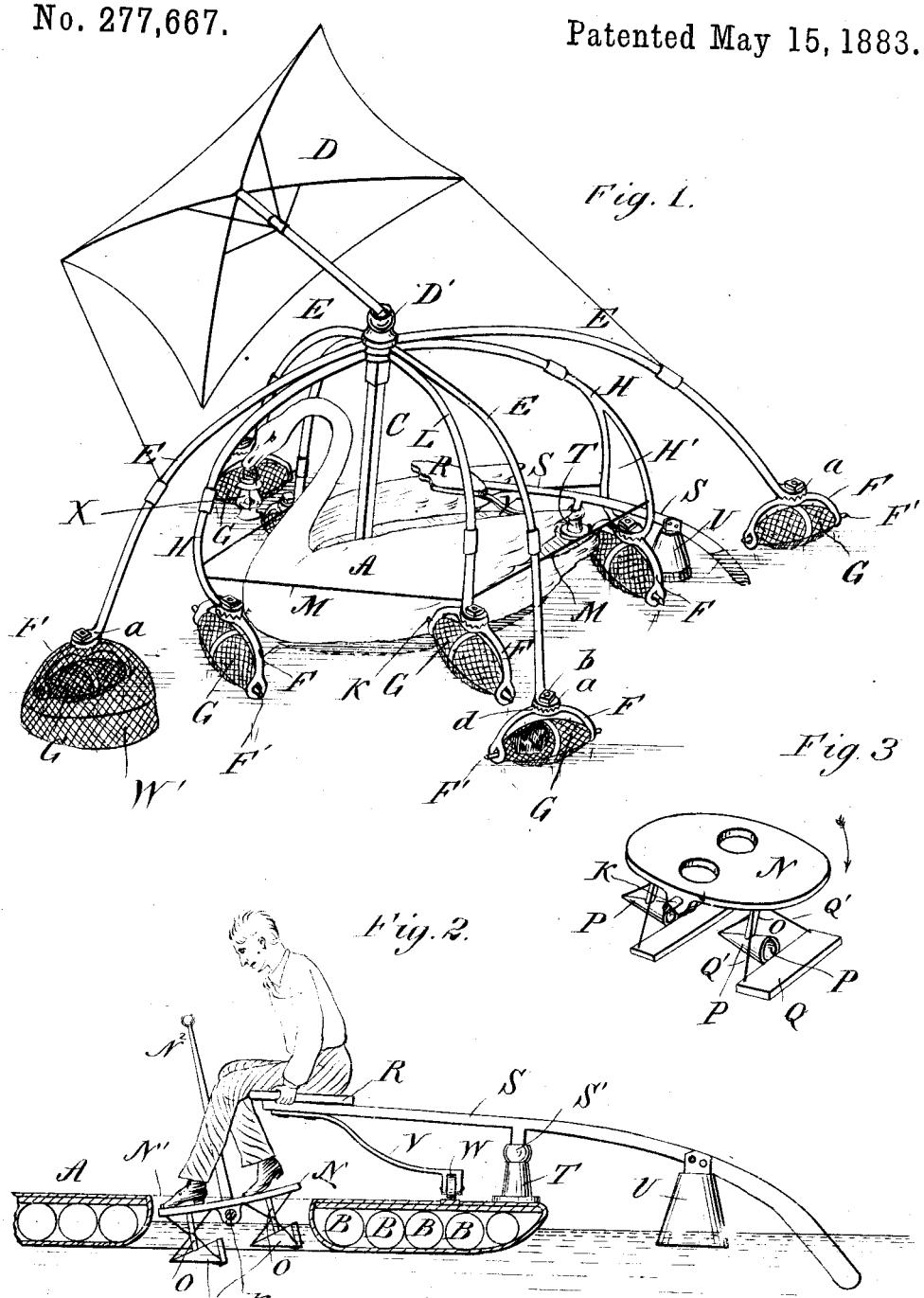
WITNESSES:
Donn Twitchell
C. Sedgwick
INVENTOR:
H. S. Blanchard
BY Munn & Co.
ATTORNEYS.

UNITED STATES PATENT OFFICE.

HENRY S. BLANCHARD, OF CAIRO, ILLINOIS.

QUADRICYCLE FOR LAND AND WATER.

SPECIFICATION forming part of Letters Patent No. 277,667, dated May 15, 1883.

Application filed August 25, 1882. (No model.)

*To all whom it may concern:*

Be it known that I, HENRY SETH BLANCHARD, of Cairo, in the county of Alexander and State of Illinois, have invented a new and Improved Quadricycle for Land and Water, of which the following is a full, clear, and complete description to enable a skilled mechanic to construct and operate the same.

The object of my invention is to provide a new and improved vehicle or vessel which may be propelled on water and made easily portable and transportable on land by its novel construction and mechanism. It is light, staunch, and durable, and can be used for various purposes, as a substitute for skiffs and portable boats, fishing and hunting craft, and may be used for a reconnoitering-boat in warfare, and for a pleasure or ferry boat, the construction of the circular form of buoys making it easily portable on land, as hereinafter described.

The invention consists in a central floating buoy, which may be made in form in imitation of any bird or animal, and in the specification and drawing is defined, selected, and represented as a figure and form of a swan, with central cavity or opening to the water, said opening flaring out underneath to facilitate its progress in the water and to provide room for propelling device, hereinafter described, and with a standard rising to suitable height, to which are attached suitable rings, to which the curved arms extending to the other combined buoys and parts are bolted, said standard fastened to and rising from the deck of the buoy just forward of the cavity, hatchway, or opening. The swan-buoy is also represented as holding a lantern in its mouth, to be used when necessary for a light. The outline of said central buoy is egg-shaped, and preferably made of galvanized sheet-iron, but may be made of other sheet metal, canvas, or wood material.

The invention further consists in having four ellipsoidal or quadricycle buoys, two of which are connected by a crank-axle, and the others connected by the curved arms bolted to rings, and the four connected together by cords or wires and inclosing the central swan-buoy, the axle entering slot-bearings underneath the main swan-buoy and in a manner supporting the same, and on land entirely supporting the same, in conjunction with the other buoys, before and behind. The size of said quadricycle-buoys may vary according to intended use, but as selected by the inventor are thirty-six inches long by thirty inches in diameter, preferably made of galvanized sheet-iron, with wood center, banded outside with convex metal band, and rigid axle running through the center longitudinally. The size selected for the main swan-buoy was seven feet in length by five feet in width, but may vary according to intended use.

The invention further consists in providing four buoys of like size and construction to the quadricycle-buoys described, connected together by the curved arms mentioned as bolted to central ring encircling said standard attached to deck of main swan-buoy, and connected by cords or bracing-wires together, as also by same to other buoys described.

The invention further consists in providing a basket inclosure of barbed wire to encircle the part of the buoys under water in localities where sharks or alligators may abound, to guard and fend off the same from injuring the buoys.

The invention consists, further, in providing an awning, held by a central rod-pole, with ball-and-socket joint and suitable bracing wires, cords, and stays, and to be used as a sail that may be set at almost any desired angle.

The invention further consists in a rocking platform, which is also a cover to the opening and hatchway of the main swan-buoy, and with a standard or lever rising from the top of the same, with cross-handles and with propelling device attached to the under part of the same, as hereinafter described.

The invention further consists in a steering-lever with a seat reaching forward partially over the rocking platform of the main swan-buoy, and attached near the stern of the buoy by standard with ball-and-socket joint, and the seat or forward end supported by a curved spring-bar with caster-wheel or roller attached, that plays on the deck, with rear end pivoted to swivel-ring at base of standard or ball-and-socket support mentioned, the rear or outer end of the lever curving downward at the stern of the buoy, and having a bell-shaped buoy rigidly attached to the same, to support the rudder part running farther rearward under water, and may be carried back under the ellipsoidal buoys as far as is desired.

The invention further consists in rods projecting downward into the water from underneath the rocking platform of the main swan-buoy, to which cones are attached, with suitable bracing rods or wires, to which said cones are attached suitable board paddles or propelling-boards, beveled at their edges and hinged to said cones at their bottom parts to propel the vessel, as hereinafter described.

Letters of reference to the drawings indicate like parts, as hereinafter described.

Figure 1 is a perspective view of the principal parts. Fig. 2 is a partial longitudinal sectional elevation of the same. Fig. 3 is a detail perspective view of the mechanism for propelling the vessel in the water. Fig. 4 is a detail sectional plan view of part of the vessel.

The main body of the vessel A has been preferably made in the shape of a swan, but may be made to imitate any bird or animal in shape. It may be made of sheet metal, canvas, wood, or other material made water-tight, and filled with cans B, previously filled with prepared cotton or cork and hermetically sealed. The object of the filling in inclosed cans is to sustain the buoyancy of the main swan-buoy in case of perforation or fracture of the outside shell or cover, or from shots or bullets in warfare. The swan-buoy A is provided, near its front end and back of the neck of the swan, with a standard, C, on the upper end of which an umbrella-shaped awning, D, is held by means of a ball-and-socket joint, D', and stay-cords or wires, so that this awning can be held at any desired inclination. This permits the umbrella-awning to be used as awning or sail, as may be desired. Four curved arms, E, project from rings on and encircling standard C near its upper end, and to which said rings the curved arms are bolted toward the front sides and rear of the swan-buoy A, and terminate near the plane of the neck of the swan-buoy in curved and convex shaped ends, with a hole in the center, through which a bolt passes with iron and rubber washers. The lower ends of each of these arms E are provided with an eye, a, having its lower surface serrated, and are secured to the bails F, provided with a central eye, d, having its upper face serrated or toothed, by means of the bolt and nut b. By this means the bail can be held at any desired inclination to the body of the vessel A. The bail F is provided at the end of each shank with an eye or hole, in which a shaft, F', is journaled, on which shaft is mounted an ellipsoidal buoy, G, which is preferably made of sheet metal filled with cans of prepared cotton or cork, or some similar buoyant filling, to sustain the buoyant character of the buoys if broken or fractured or perforated. These buoys are surrounded, when necessary, with the basket-shaped barbed-wire netting or inclosure W', to prevent sharks or alligators from injuring them. Two curved arms, H H, bolted at and to rings encircling standard C, project in a curve to the front and rear of the main swan-buoy, the forward arm curving inward toward the breast of the swan, and the rear arm is provided with a loop or opening, H', near its lower end, and the said arms are secured to the bails F, carrying buoys G in the same manner as the arms E.

On the ends of the shaft K, projecting from the vessel A or from the sides of the main swan-buoy, the ellipsoidal buoys G are mounted rigidly, so as to turn with this shaft when it is used and revolved by the cranks K', and also turn in the holes or eyelets of the bails, to which are attached the curved arms L, projecting downward from the rings or bands that encircle standard C to the sides of the main swan-buoy A. The arms H L are all connected by bracing wires or cords M.

On a shaft or pivotal bearings on the deck of the swan-buoy the rocking platform N is mounted, which plays above the opening N' through the deck of the vessel A. Two rods, O O, project downward from the under side of the platform N, near the front and rear, and to the lower ends of these rods O O cones P are attached, the points projecting toward the front of the vessel. The boards Q are hinged to the larger or base part of the cones P at the bottom, so that they can swing upward, and their ends are braced by wires or cords Q, pivoted to the rods O O.

The seat R, above the rocking platform, rests on the inner end of a curved lever, S, which turns by means of a ball-and-socket joint, S', on the short standard T at the rear of the vessel or main swan-buoy A. The rear end of this lever S projects through the loop H' of the rear arm H into the water, and serves as a rudder, and is supported by a bell-shaped buoy, U. A curved spring-bar, V, attached to the under side of the seat and projecting downward and backward, is provided at its lower part, near the deck, with a caster wheel or roller, W, resting on the deck or floor of the vessel.

A lantern, X, is held in the mouth of the swan, to be used as occasion requires for a light.

A rod or lever, N², projects upward from the rocking platform N, provided with a cross-handle, that assists the person in propelling the boat by enabling the operator to utilize both muscle and weight in the propulsion of the vessel.

The operation is as follows, if the vessel is to be used in combination on the water: The four buoys G at the ends of the arms E are adjusted parallel with the length of the vessel. The operator sits on the seat R, with his feet on the rocking platform N, and, with his hands on the cross-handle of the lever N², rocks the oscillating platform N. When the cones P are moved forward the board paddles Q rest flat in the water and present little resistance to the forward motion; but when the platform oscillates forward and the cones P are moved back the board paddles fold up against the wider ends of the cones P and present sufficient resistance to the water to propel the vessel forward. The form of the cones P present little resistance to the forward motion. If desired, the vessel may be provided with paddles mounted on the ends of the shaft K; but I prefer to use the cones P and board paddles Q.

The steering-lever S is used to steer the vessel in any desired direction, and to operate it the operator moves the seat R sidewise.

If the vessel is to be propelled on land, all the buoys may be adjusted parallel to serve as wheels; or the outside supporting-buoys raised up, detached, and removed, and the buoys on and attached to the axle K may serve as driving-wheels when the same is rotated by the cranks K', and the other quadricycle-buoys serve as supporting-wheels, the one in front being used for a guide-wheel, the same as in a velocipede or quadracycle proper.

Having thus fully described the invention and its functions, I claim as new and desire to secure by Letters Patent—

1. The combination, with a floating body or vessel having a vertical standard and means for propelling the same, of curved arms secured to said standard and provided with buoys on their lower ends, substantially as herein shown and described.

2. The combination, with a vessel A, standard C, rings and arms E, projecting downward, with buoys G attached, the bails F, shanks and eyelets F', and bolts and washers to secure the same, as described and set forth.

3. The combination, with the vessel A, of the standard C, the ellipsoidal buoys G, and their connecting mechanism, the basket-shaped barbed-wire-netting inclosure, for purposes described and set forth.

4. The combination, with the vessel A, provided with the vertical standard C, and the curved arms E H L, provided with buoys at their lower ends, of the awning D, swiveled to the upper end of said standard, substantially as herein shown and described.

5. The combination, with the vessel A and means for propelling the same, of the steering-lever S, swiveled to the body and provided with the seat R at its forward end, and the spring-bar V, provided with the roller W, substantially as herein shown and described.

6. The combination, with the vessel A and means for propelling the same, of the steering-lever S, swiveled to the body and provided with the seat R, and the bar V, provided with the roller W, and the buoy U, substantially as herein shown and described.

7. The combination, with the vessel A, of the rocking platform N, the covers P, and the paddles Q, substantially as herein shown and described.

8. The combination, with the vessel A B C, provided with the arms H L, having buoys on their ends, of the platform N, the covers P, the paddles Q, and the steering-lever S, provided with the seat R, substantially as herein shown and described.

HENRY SETH BLANCHARD.

Witnesses:
A. COMINGS,
FRED. STICHER.